US010578141B1

(12) United States Patent
Broughton (10) Patent No.: US 10,578,141 B1
(45) Date of Patent: Mar. 3, 2020

(54) SECURING PIN FOR SECURING STRUCTURAL MEMBERS

(71) Applicant: Fyrn, San Francisco, CA (US)

(72) Inventor: Roskear Porter Broughton, San Francisco, CA (US)

(73) Assignee: Fyrn, San Francisco, CA (US)

( * ) Notice: Subject to any disclaimer, the term of this patent is extended or adjusted under 35 U.S.C. 154(b) by 0 days.

(21) Appl. No.: 16/540,030

(22) Filed: Aug. 13, 2019

Related U.S. Application Data

(62) Division of application No. 14/990,593, filed on Jan. 7, 2016, now Pat. No. 10,378,570.

(60) Provisional application No. 62/100,830, filed on Jan. 7, 2015.

(51) Int. Cl.
*F16B 12/24* (2006.01)
(52) U.S. Cl.
CPC .................................. *F16B 12/24* (2013.01)
(58) Field of Classification Search
CPC .... F16B 7/0466; F16B 12/2063; F16B 12/18; F16B 12/20; F16B 12/2009; F16B 12/24
See application file for complete search history.

(56) References Cited

U.S. PATENT DOCUMENTS

| | | | |
|---|---|---|---|
| 3,132,557 | A | 5/1964 | Bauer |
| 3,672,710 | A | 6/1972 | Kroopp |
| 3,730,568 | A | 5/1973 | Giovannetti |
| 3,810,341 | A | 5/1974 | Holz |
| 4,116,573 | A | 9/1978 | Fuchs |
| 4,334,797 | A | 6/1982 | Wahlin |
| 4,641,983 | A | 2/1987 | Strassle |
| 4,893,959 | A | 1/1990 | Offenbroich |
| 5,209,598 | A | 5/1993 | Zullig |
| 5,375,923 | A | 12/1994 | Hall et al. |
| 6,960,045 | B2 | 11/2005 | Schmalzhofer |
| 8,528,188 | B2 | 9/2013 | Vestergaard-jensen |
| 8,992,114 | B2 | 3/2015 | Ajanovic |
| 9,402,474 | B2 * | 8/2016 | Chang ..................... F16B 12/20 |

* cited by examiner

*Primary Examiner* — Daniel J Wiley
(74) *Attorney, Agent, or Firm* — Aka Chan LLP (57) ABSTRACT

A securing pin for securing two structural members that can be used in the assembly of modular furniture. In one embodiment, the securing pin includes a main cylindrical body having an elongated countersink portion positioned at a first end of the main cylindrical body of the securing pin. The first end of the securing pin configured to be secured to a first structural member and a second end of the securing pin configured to be secured to a second structural member. In one embodiment, the second end of the securing pin is secured to the second structural member by a press-fit attachment with a securing split-ring. A fastening device inserted within the elongated countersink portion of the securing pin to secure, and firmly abut, the first structural member to the second structural member.

20 Claims, 8 Drawing Sheets

SECURING PIN FOR SECURING STRUCTURAL MEMBERS

CROSS-REFERENCE TO RELATED APPLICATIONS

This patent application is a continuation of U.S. patent application Ser. No. 14/990,593, filed Jan. 7, 2016, issued as U.S. Pat. No. 10,378,570 on Aug. 13, 2019, which claims the benefit of U.S. patent application Ser. No. 62/100,830, filed Jan. 7, 2015. These applications are incorporated by reference along with all other references cited in this application.

BACKGROUND OF THE INVENTION

The present application relates generally to a securing pin and securing pin assembly for securing one structural member to another structural member and more particularly to a securing pin and securing pin assembly for securing structural members for use in a modular furniture assembly.

Modular design of products attempts to combine the manufacturing advantages provided by standardization with the ability to customize the product. In modular design, the components of the product are manufactured separately and fastening devices are used to assemble the components in various configurations, resulting in the desired product. For example, the modular design techniques employed in modular furniture allow the furniture to be sold and shipped in a compact, unassembled form and then assembled by the end-user. The ability to distribute the modular furniture in a more compact form reduces the distribution costs of the modular furniture. Additionally, the modularization of modular furniture allows a variety of component parts to be assembled into numerous design configurations.

While there are obvious benefits to the modular design of products, there also exist several disadvantages. A first disadvantage is the loss of structural strength that results from the use of the fastening devices to connect the modular components together. A second disadvantage is that many modular products are considered to be difficult to assemble and may require the end-user to read extensive directions, which is undesirable. A third disadvantage of modular products, and specifically modular furniture, is that modular furniture is equated with an inferior product. It is evident from the outward appearance of most modular furniture that the furniture is fabricated of components connected by fastening devices, which is commonly considered inferior to custom crafted furniture.

Accordingly, there is a need in the art for an improved modular product that utilizes a fastening device that provides increased strength at the interface point between two modular components. There also exists a need in the art for a modular product that is easy to assemble and limits the visibility of the fastening devices, thereby improving the perceived quality of the modular product.

BRIEF SUMMARY OF THE INVENTION

A securing pin for securing one structural member to another structural member for use in a modular product is described.

A securing pin for securing two structural members that can be used in the assembly of modular furniture. In one embodiment, the securing pin includes a main cylindrical body having an elongated countersink portion positioned at a first end of the main cylindrical body of the securing pin. The first end of the securing pin configured to be secured to a first structural member and a second end of the securing pin configured to be secured to a second structural member. A fastening device inserted within the elongated countersink portion of the securing pin to secure, and firmly abut, the first structural member to the second structural member.

In one embodiment, the securing pin of the present invention includes an elongated countersink portion and an elongated aperture positioned substantially at the center point of the elongated countersink portion. The elongated countersink portion and the elongated aperture are elongated in a direction along a longitudinal axis of the securing pin.

In another embodiment, the securing pin of the present invention includes an elongated countersink portion without an elongated aperture positioned substantially at the center point of the elongated countersink portion. In this embodiment, the elongated countersink portion is elongated in a direction along a longitudinal axis of the securing pin.

In an additional embodiment, the securing pin may be secured within the second structural member by a securing split-ring positioned with a cylindrical void formed in the second structural member. The securing split-ring includes a cylindrical body having an interior diameter, an exterior diameter and a gap formed between the interior diameter and exterior diameter.

In one embodiment, the securing pin may be secured in the second structural member by inserting the second end of the securing pin into a securing split-ring that is positioned within a void of the second structural member. The dimensions of the second end of the securing pin are such that inserting the second end into the interior diameter of the securing split-ring results in the gap of the split-ring increasing in size to accommodate the diameter of the second end of the securing pin, thereby securing the securing pin in the second structural member by a press-fit attachment with the securing split-ring.

In accordance with the present invention an improved device for securing structural members is provided.

DETAILED DESCRIPTION OF THE INVENTION

Those of ordinary skill in the art will realize that the following detailed description of embodiments in this specification is illustrative only, and is not intended to be in any way limiting. Other embodiments will readily suggest themselves to such skilled persons having the benefit of this disclosure. It will be apparent to one skilled in the art that these specific details may not be required to practice the embodiments. In the following description of the embodiments, substantially the same parts are denoted by the same reference numerals.

In accordance with the present invention, in general, a securing pin is a fastener that is inserted into holes located in two adjacent structural members that secures the two structural members together. In one embodiment, the securing pin, in accordance with the present invention, may include an elongated countersink portion. In general, a countersink is a conical hole cut into a manufactured object. In the present invention the countersink portion may be elongated along a longitudinal axis of the securing pin. In an additional embodiment the countersink portion may be a nonconical hole cut, such as a ramped hole cut.

Figure 1A:
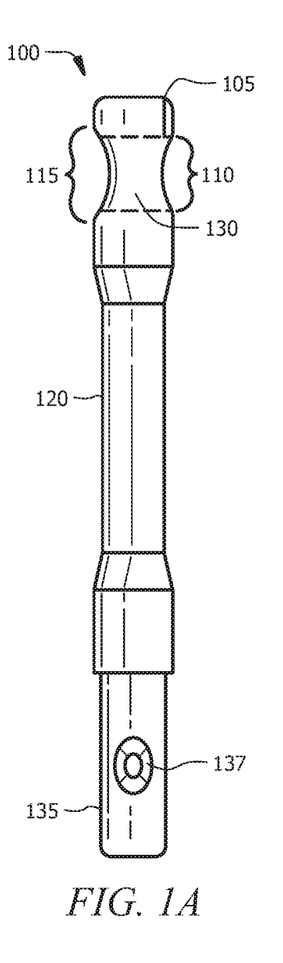
FIGS. 1A, 1B, 1C, and 1D are diagrammatic side views of various embodiment of the securing pin of the present invention.
Figure 1B:
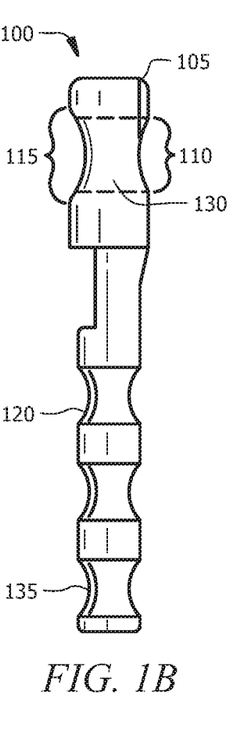
Figure 1C:
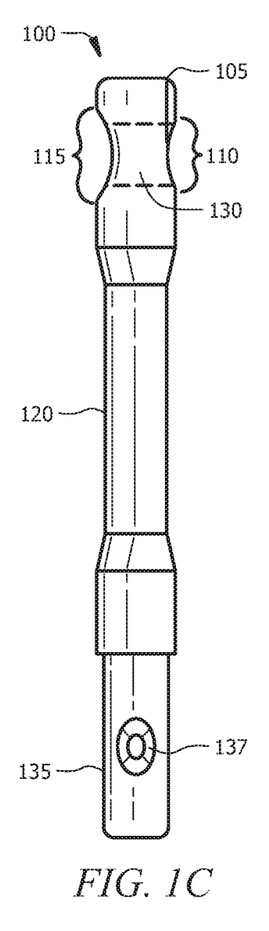

With reference to FIGS. 1A-1D, a side view of various embodiments of a securing pin 100 having an elongated countersink portion 115 in accordance with the present invention are illustrated. In general, the securing pin 100 comprises a main cylindrical body 120 having a first end 105 and a second end 135. As shown in FIGS. 1A-1D, the elongated countersink portion 115 of the securing pin 100 is positioned at a first end 105 of the securing pin 100. The first end 105 of the securing pin 100 is configured to be inserted into a hole fabricated in a first structural member. A second end 135 of the securing pin 100 may be constructed in various configurations as necessary to be inserted into a hole fabricated in a second structural member. The second end 135 of the securing pin 100 may be configured to be secured within the second structural member using a fastening device or an appropriate epoxy material (FIG. 1B, FIG. 1D), or alternatively, the second end 135 of the securing pin 100 may be configured to establish a press-fit attachment (FIG. 1A, FIG. 1C) within the second structural member. In one embodiment, the second end 135 of the securing pin 100 is secured within the second structural member by inserting a fastening device through an opening 137 in the second end 135 of the securing pin 100 (FIG. 1A, FIG. 1C)

As shown in the embodiment of FIGS. 1A, 1B, and 1C, the securing pin 100 includes an elongated opening 110 opposite from, and substantially in line with, the elongated countersink portion 115. Additionally, an elongated aperture 130 is positioned between the elongated countersink portion 115 and the elongated opening 110. In this embodiment, to secure the first structural member to the second structural member, with the first end 105 of the securing pin 100 positioned within a hole of the first structural member and the second end 135 of the securing pin positioned within a hole of the second structural member, a fastener, such as a screw, can be inserted into the elongated countersink portion 115 of the securing pin 100, through the elongated aperture 130 and exiting through the elongated opening 110.

Figure 1D:
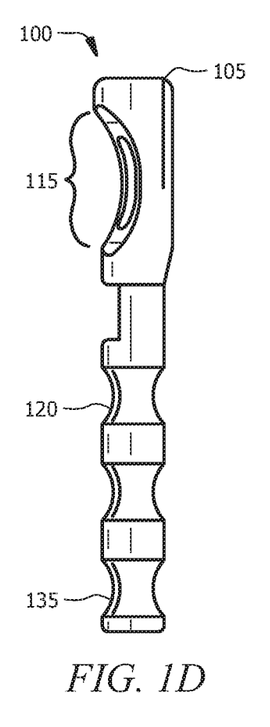
Figure 2A:
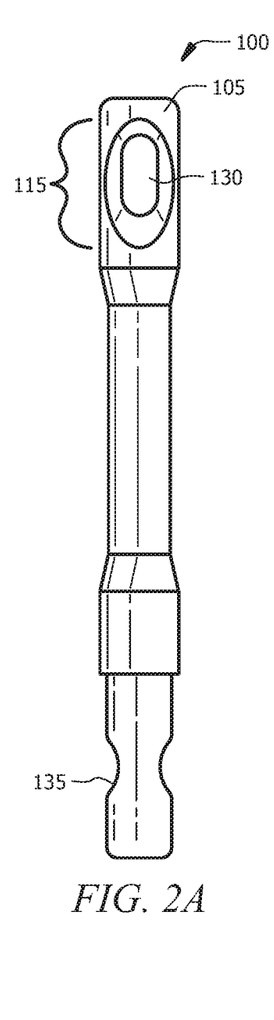
FIGS. 2A, 2B, 2C, and 2D are diagrammatic top views of various embodiment of the securing pin of the present invention.
Figure 2B:
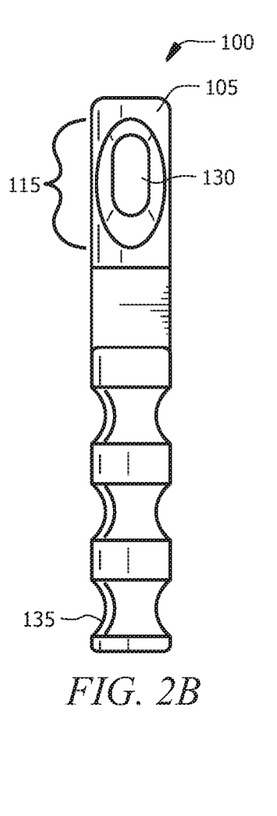
Figure 2C:
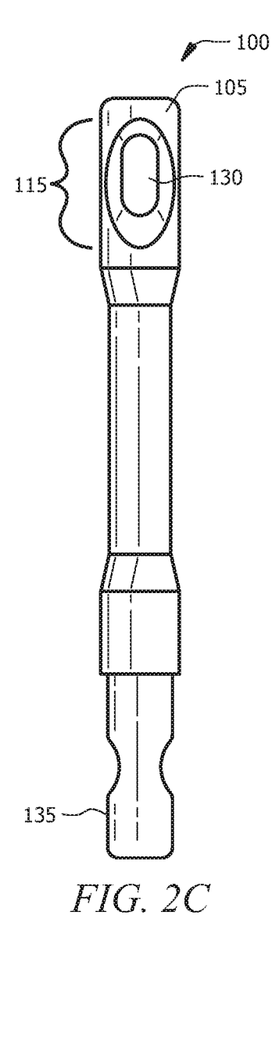
Figure 2D:
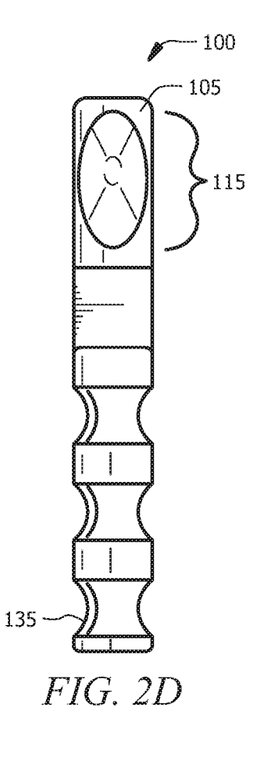
Figure 3A:
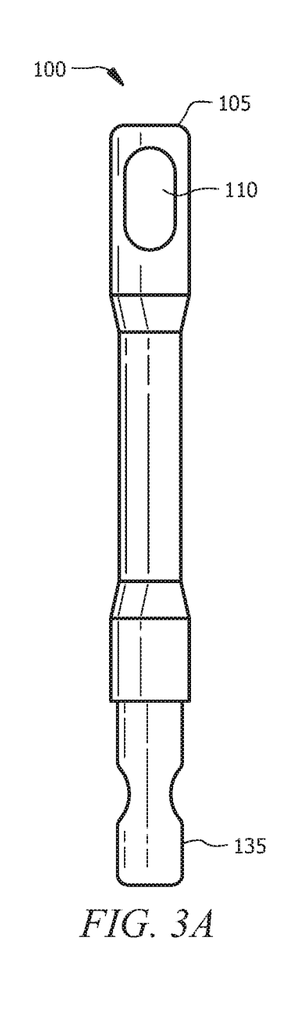
FIGS. 3A, 3B, 3C, and 3D are diagrammatic bottom views of various embodiment of the securing pin of the present invention.
Figure 3B:
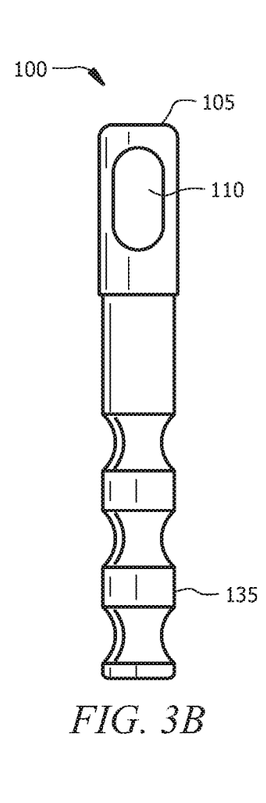
Figure 3C:
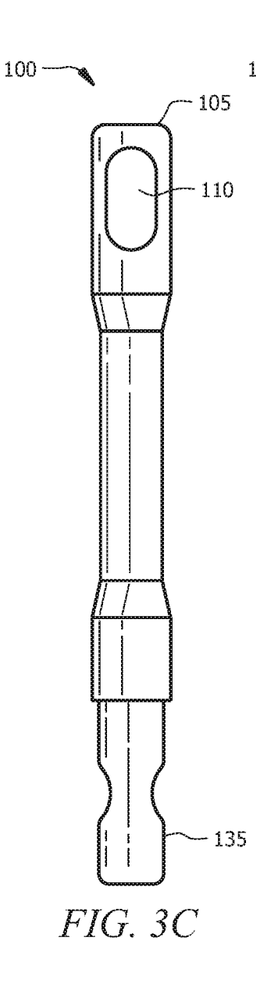
Figure 3D:
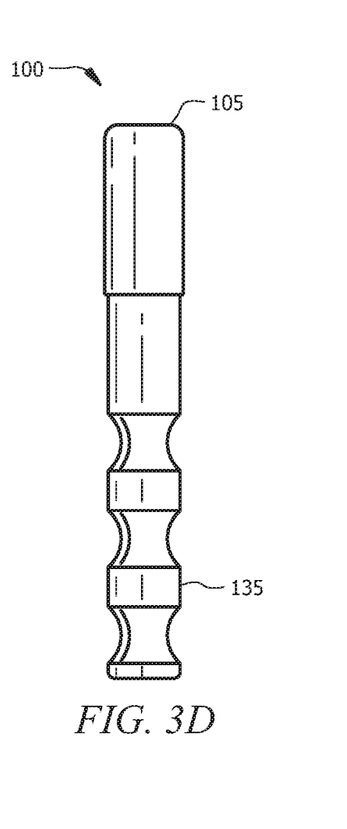

In an additional embodiment, shown in FIG. 1D, the securing pin 100 does not include an elongated opening 110 or an associated elongated aperture 130, and as such, when securing the first structural member to the second structural member, a fastener inserted into the elongated countersink portion 115 of the securing pin 100 will be engaged within the elongated countersink portion 115 of the securing pin 100 when in the secured position.

With reference to FIGS. 2A-2D, a top view of the various embodiments of the securing pin 100 having an elongated countersink portion 110 as illustrated in FIGS. 1A-1D are illustrated. As shown in FIGS. 2A-2D, the elongated countersink portion 110 of the securing pin 100 is positioned at a first end 105 of the securing pin 100. The first end 105 of the securing pin 100 is configured to be inserted into a hole fabricated in a first structural member. A second end 135 of the securing pin 100 may be constructed in various configurations as necessary to be inserted into a hole fabricated in a second structural member. The second end 135 of the securing pin 100 may be configured to be secured within the second structural member using a fastening device or an appropriate epoxy material (FIG. 2B, FIG. 2D), or alternatively, the second end 135 of the securing pin 100 may be configured to establish a press-fit attachment (FIG. 2A, FIG. 2C) within the second structural member. As can clearly be seen in this top view, the embodiments of FIGS. 2A, 2B, and 2C include an elongated aperture 130 extending between the elongated countersink portion 115 of the securing pin 100 and the elongated opening, opposite the elongated countersink portion 115. Additionally, the embodiment illustrated in FIG. 2D does not include an elongated opening or an elongated aperture.

With reference to FIGS. 3A-3D, a bottom view of the various embodiments of the securing pin 100 having an elongated countersink portion 110 as illustrated in FIGS. 1A-1D are illustrated. As shown in FIGS. 3A-3D, the elongated countersink portion 110 of the securing pin 100 is positioned at a first end 105 of the securing pin 100. The first end 105 of the securing pin 100 is configured to be inserted into a hole fabricated in a first structural member. A second end 135 of the securing pin 100 may be constructed in various configurations as necessary to be inserted into a hole fabricated in a second structural member. The second end 135 of the securing pin 100 may be configured to be secured within the second structural member using a fastening device or an appropriate epoxy material (FIG. 3B, FIG. 3D), or alternatively, the second end 135 of the securing pin 100 may be configured to establish a press-fit attachment (FIG. 3A, FIG. 3C) within the second structural member. As can clearly be seen in this bottom view, the embodiments of FIGS. 3A, 3B, and 3C include an elongated opening 110 positioned opposite the elongated countersink portion and an elongated aperture 130 extending between the elongated countersink portion of the securing pin 100 and the elongated opening 110. Additionally, the embodiment illustrated in FIG. 3D does not include an elongated opening or an elongated aperture.

In operation of the securing pin 100 of the present invention for securing two structural members, with the first end 105 of the securing pin 110 inserted into a first structural member and the second end 135 of the securing pin 110 inserted into and secured to a second structural member, a fastening device, such as a screw, is inserted through an aperture of the first structural member, that is substantially aligned with the elongated countersink portion 110 of the securing pin 100. Following insertion of the fastening device through the aperture of the first structural member, the fastening device is inserted into the elongated countersink portion 110 of the securing pin 100. After the fastening device has been inserted through the aperture of the first structural member and into the elongated countersink portion 110 of the securing pin 100, the fastening device will be in contact with the elongated countersink portion 110 of the securing pin 100. In one embodiment, subsequent to the contact of the fastening device with the elongated countersink portion 110, the fastening device is tightened, causing the end of the fastening device that is in contact with the elongated countersink portion 110 to travel down the sloped side of the countersink portion 110 until the fastening device is positioned within the elongated aperture 130 of the securing pin 100. In an additional embodiment, wherein the securing pin 100 does not have an elongated aperture 130, the fastening device is tightened until the fastening device is positioned substantially within the center of the elongated countersink portion 110.

In the present invention, tightening the fastening device causes the fastening device to travel down the sloped side of the elongated countersink portion 110, thereby urging the second end 135 of the securing pin 100 in a longitudinal direction toward the first end 105 of the securing pin 100 until the fastening device is either positioned within the elongated aperture 130 or, if the securing pin 100 does not include an elongated aperture 110, until the fastening device is positioned to be in contact with a center point of the elongated countersink portion 110. As such, the elongated countersink portion 110 of the securing pin 100 enables the first structural member to be firmly abutted to the second structural member when a fastening device is inserted into the elongated countersink portion 110. This firm connection between the first structural member and the second structural member afforded by the elongated countersink portion 110 securing pin 100 provides increased strength at the interface point between the first structural member and the second structural member. The perceived quality of a modular product incorporating the structural members and the securing pin 100 is also improved as a result of the visual appearance of the interface point between the structural members.

Figure 4A:
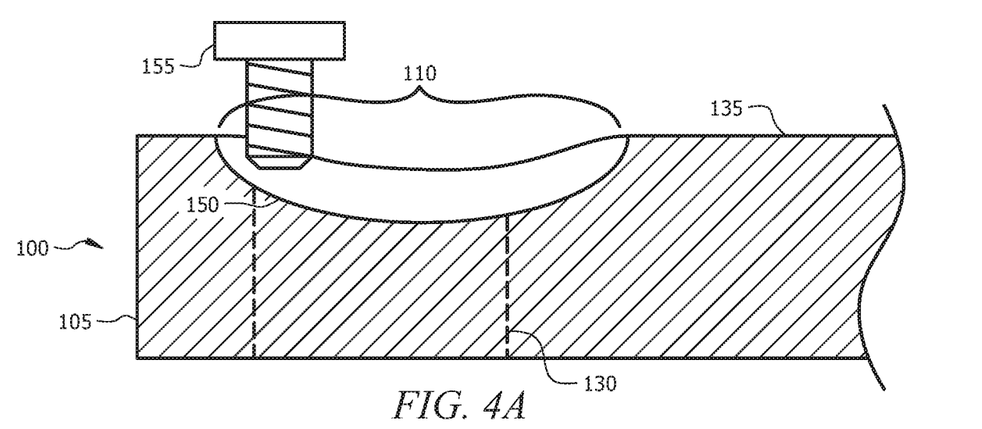
FIGS. 4A and 4B are diagrammatic views of an embodiment of the securing pin comprising an elongated aperture in accordance with the present invention.
Figure 4B:
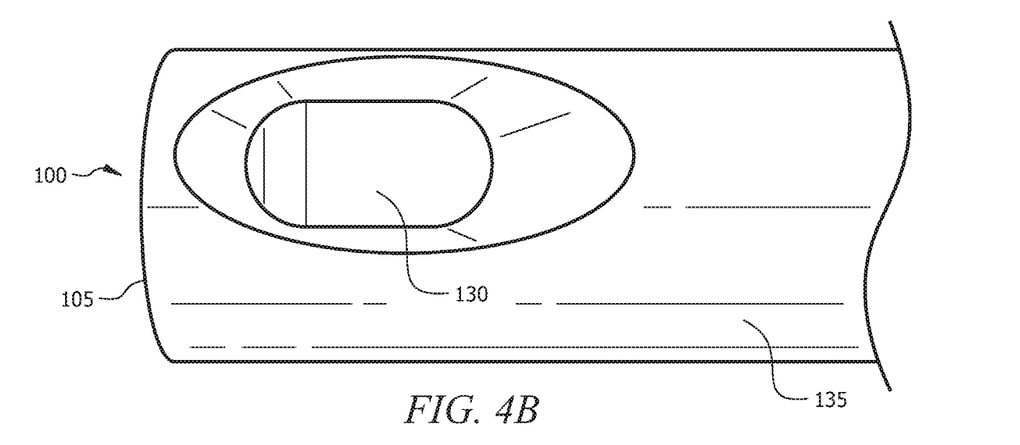

With reference to FIGS. 4A and 4B, a securing pin 100 in accordance with the present invention having an elongated countersink portion 110 and an elongated aperture 130 is illustrated. A cross-sectional view of the securing pin 100 is shown in FIG. 4A and a top-down view of the securing pin 100 is shown in FIG. 4B. Referring to FIG. 4A, assuming that the first end 105 of the securing pin 100 has been inserted into a first structural member and that the second end 135 of the securing pin 100 has been inserted into a second structural member, a fastening device 155 is inserted through the aperture of the first structural member and is subsequently positioned to be in contact with a first side 150 of the elongated countersink portion 110. After the fastening device 155 is inserted into the aperture, the end of the fastening device 155 extending through the aperture engages with a complementary receiving element positioned within the first structural member. In a particular embodiment, the fastening device 155 is a screw and the complementary receiving element is a nut having complementary threading for receiving the screw. In this embodiment, as the fastening device 155 is tightened by engaging the end of the fastening device 155 with the complementary receiving element, the fastening device 155 travels down the first side 150 of the elongated countersink portion 110, thus pulling the first structural member closer to the second structural member by urging the second end 135 of the securing pin 100 in the direction of the first end 105 of the securing pin 100. As the tightening of the fastening device 155 continues, the fastening device 155 is eventually positioned within the elongated aperture 130 of the securing pin 100, thereby firmly abutting the first structural member against the second structural member.

Figure 5A:
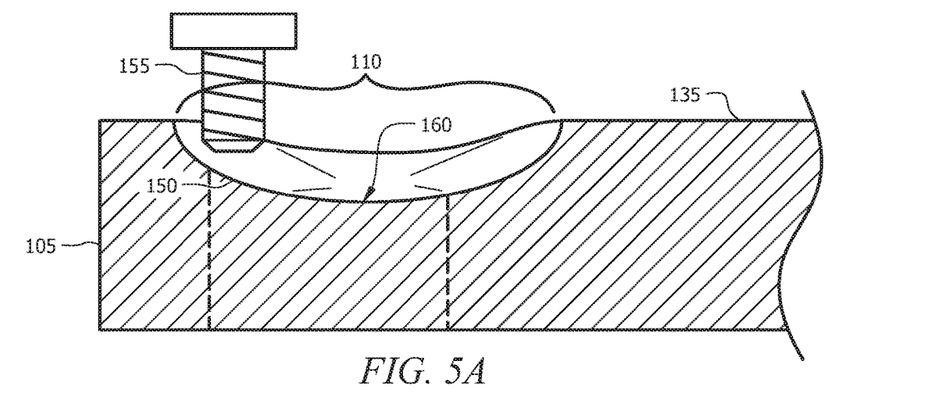
FIGS. 5A and 5B are diagrammatic views of an embodiment of the securing pin without an elongated aperture in accordance with the present invention.
Figure 5B:
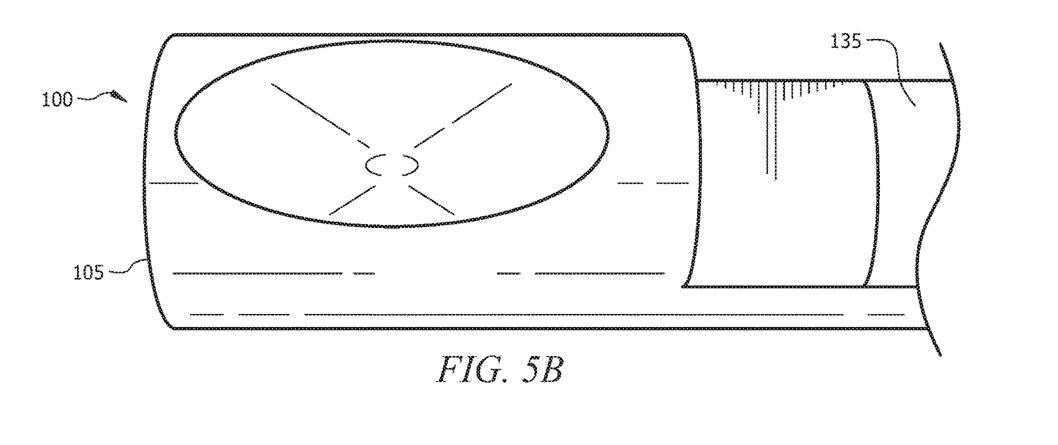

With reference to FIGS. 5A and 5B, a securing pin 100 in accordance with the present invention having an elongated countersink portion 110 without an elongated aperture 130 is illustrated. A cross-sectional view of the securing pin 100 is shown in FIG. 5A and a top-down view of the securing pin 100 is shown in FIG. 5B. Referring to FIG. 5A, assuming that the first end 105 of the securing pin 100 has been inserted into a first structural member and that the second end 135 of the securing pin 100 has been inserted into a second structural member, a fastening device 155 is inserted through the aperture of the first structural member and is subsequently positioned to be in contact with a first side 150 of the elongated countersink portion 110. In this embodiment, as the fastening device 155 is tightened, the fastening device 155 travels down the first side 150 of the elongated countersink portion 110, thus pulling the first structural member closer to the second structural member by urging the second end 135 of the securing pin 100 in the direction of the first end 105 of the securing pin 100. As the tightening of the fastening device 155 continues, the fastening device 155 is pulled closer to the center point 160 of the elongated countersink portion 110 and the fastening device 155 is eventually tightened to the point where the securing pin 100 is secured within the first structural member and the fastening device 155 is firmly abutted against the elongated countersink portion 110 of the securing pin 100. With the fastening device 155 firmly abutted against the elongated countersink portion 110 of the securing pin 100, the first structural member is firmly abutted against the second structural member.

Figure 6:
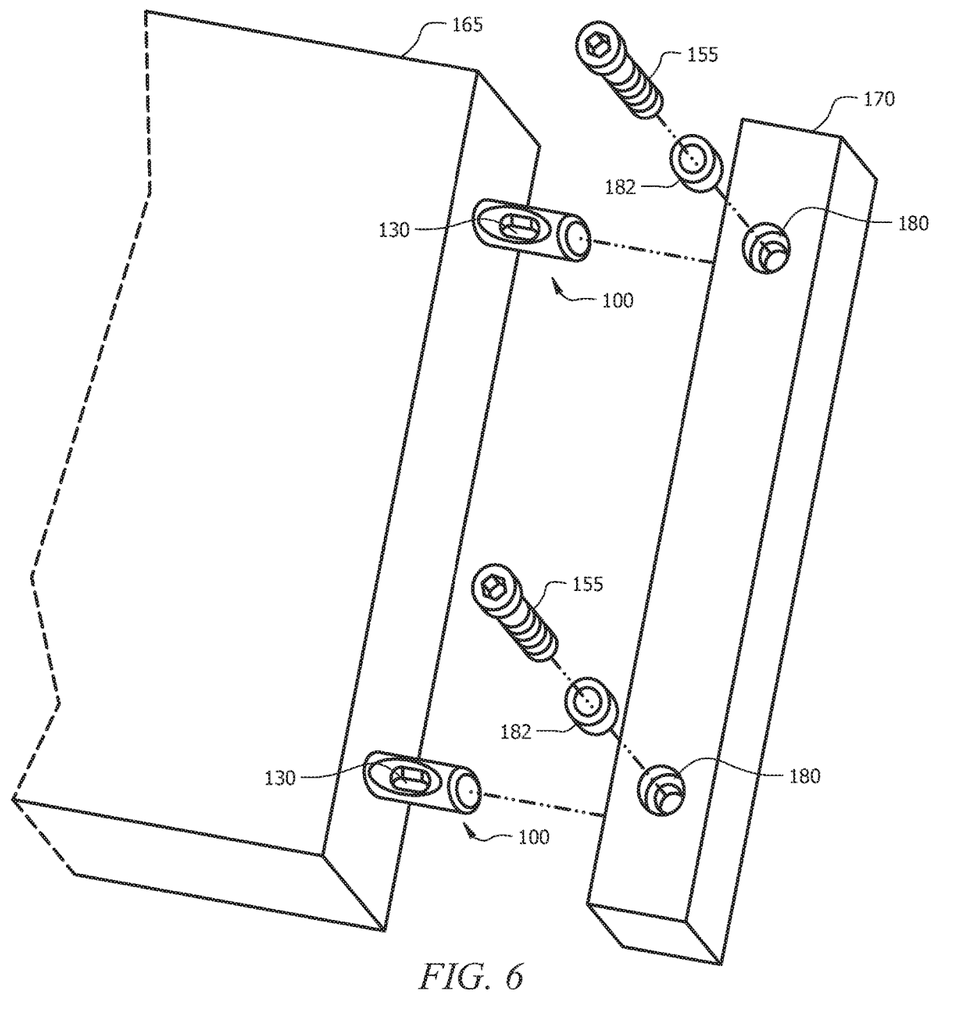
FIG. 6 is a diagrammatic view of a modular product incorporating the securing pin of the present invention.

With reference to FIG. 6, the components of an exemplary modular product utilizing the securing pin 100 in accordance with the present invention are illustrated. As shown in FIG. 6, a second end of securing pins 100 is inserted and secured into a second structural member 165. The first structural member 170 is then aligned with the two securing pins 100 such that the first end of the securing pins 100 is inserted into the first structural member 170 and positioned such that the elongated countersink portion 130 of the securing pins 100 is substantially aligned with the apertures 180 of the first structural member 170. A complementary receiving element 182 is then positioned within each of the apertures 180 of the first structural member 170. In a particular embodiment, the fastening device 155 is a screw and the complementary receiving element 182 is a nut having complementary threading for receiving the screw. A fastening device 155 is then inserted into each of the two apertures 180 of the first structural member 170 to engage with the complementary receiving elements 182 As the fastening devices 155 are tightened within the complementary receiving elements 182, the first structural member 170 is urged towards the second structural member 165, as previously described, until the fastening devices 155 are positioned within the elongated countersink portion 130 of the securing pins 100 and first structural member 170 and the second structural member 165 are firmly abutted against each other.

Figure 7A:
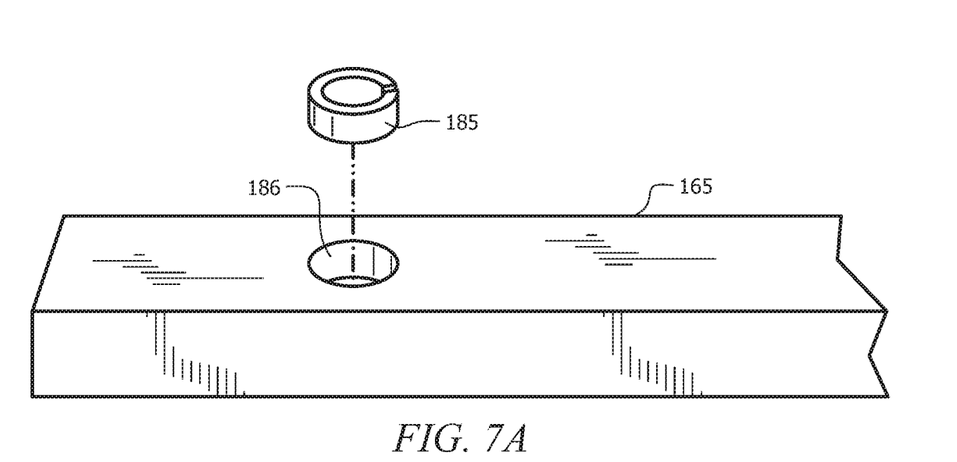
FIGS. 7A, 7B, 7C, and 7D are diagrammatic views of the securing split-ring in accordance with an embodiment of the present invention.
Figure 7B:
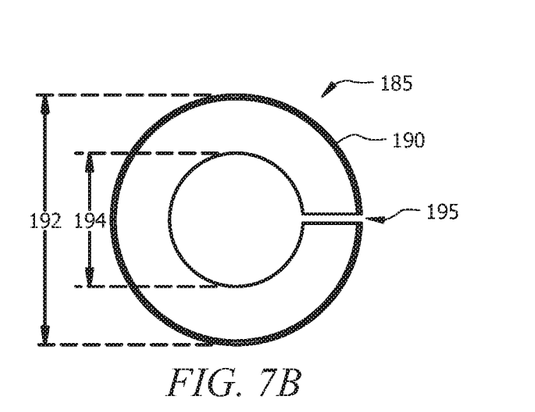
Figure 7C:
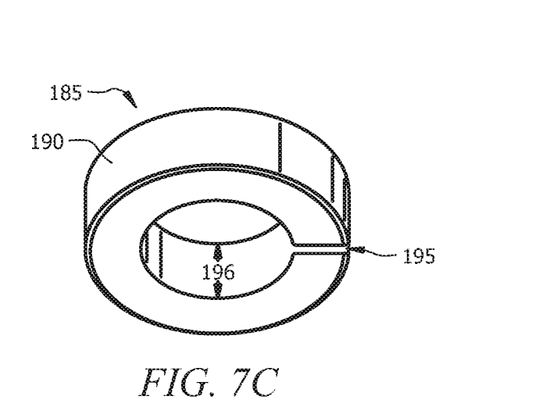
Figure 7D:
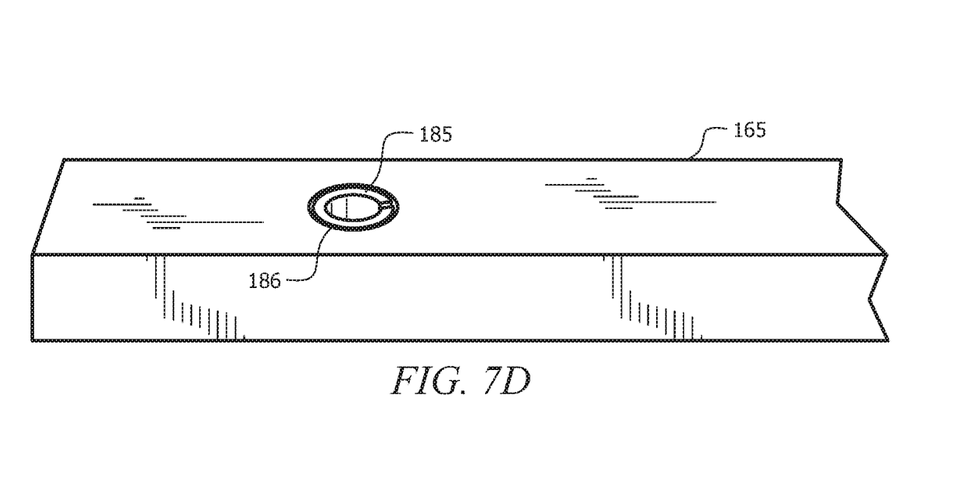

With reference to FIG. 7A, in one embodiment, the second structural member 165 may include a securing split-ring 185 positioned within a substantially cylindrical void 186 formed in the second structural member 165. As shown in more detail in FIG. 7B and FIG. 7C, the securing split-ring 185 may be formed by a substantially cylindrical washer 190 having an interior diameter 194, an exterior diameter 192 and a depth 196. The cylindrical washer 190 further includes a gap 195 formed between the interior diameter 194 and the exterior diameter 192 to form the securing split-ring 185. As shown with reference to FIG. 7D, the securing split-ring 185 is dimensioned to be positioned within a void 186 formed in the second structural member 165.

Figure 8:
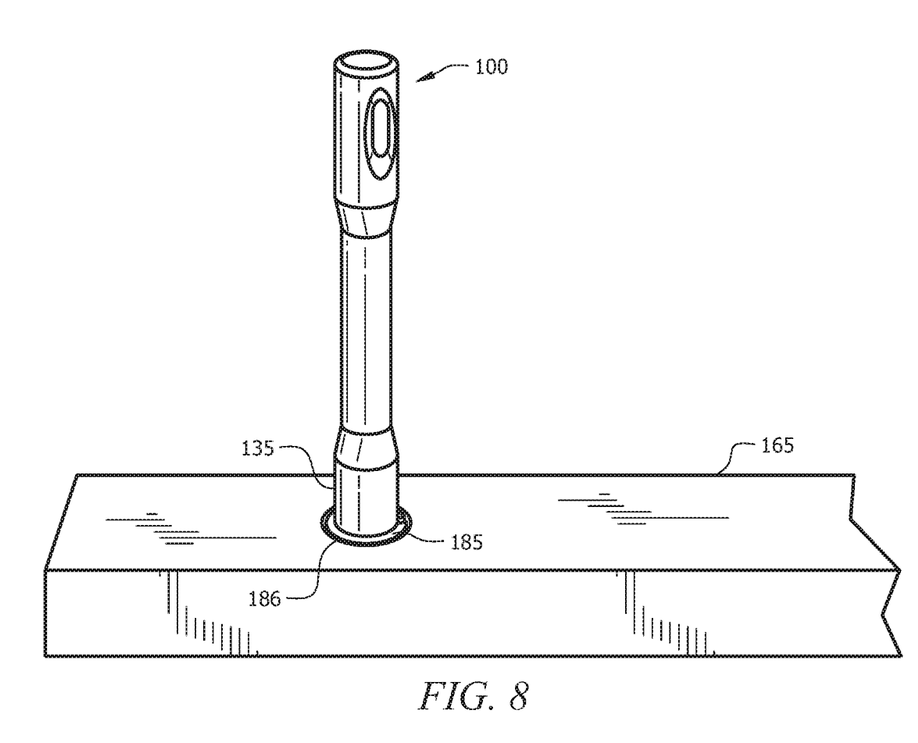
FIG. 8 is a diagrammatic view of the securing split-ring in cooperation with the second securing member in accordance with an embodiment of the present invention.

With reference to FIG. 8, the securing split-ring 185 of the present invention is used to secure the second end 135 of the securing pin 100 to the second structural member 165 using a press fit. In order to provide the press-fit, the second end 135 of the securing pin 100 is dimensioned to be slightly larger than the interior diameter 194 of the securing split-ring 185. In operation, the securing split-ring 185 is positioned within the substantially cylindrical void 186 of the second structural member 165 and the second end 135 of the securing pin 100 is inserted into the interior diameter 194 of the securing split-ring 185. Inserting the second end 135 of the securing pin 100 into the interior diameter 194 of securing split-ring 185 causes the exterior diameter 192 of the securing split-ring to expand within the void 186 thereby resulting in a secured press-fit between the securing pin 100 and the second structural member 165. The gap 195 formed within the cylindrical washer 190 of the securing split-ring 185 allows the exterior diameter 192 of the securing split-ring 185 to expand within the void 186 when the second end 135 of the securing pin 100 is inserted into the interior diameter 194 of the securing split-ring.

The present invention provides an improved modular product that utilizes a fastening device that provides increased strength at the interface point between two modular components. The present invention additionally provides a modular product that is easy to assemble and that has an improved perceived quality.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
providing a first structural member of a modular furniture assembly;
providing a second structural member of the modular furniture assembly;
providing a split-ring washer;
providing a securing pin comprising a main body having a first end and a second end, wherein the second end of the main body comprises a larger diameter than an interior diameter of the split-ring washer, and the first end of the main body comprises an elongated countersink portion and an elongated aperture;
inserting the split-ring washer into a void formed in the second structural member, wherein the split-ring washer couples to the second structural member by exterior sides of the split-ring washer engaging with sides of the void; and
inserting the second end of the securing pin into a hole of the split-ring washer, wherein the second end is pushed into the split-ring washer such that an exterior diameter of the split-ring washer expands to engage further with sides the void.

2. The method of claim 1 further comprising:
inserting the first end of the main body of the securing pin into the first structural member; and
inserting a fastening device, comprising a shank, through a void formed in the first structural member and the shank passes through the elongated aperture of the main body of the securing pin.

3. The method of claim 2 further comprising: coupling a complementary receiving element to the first structural member; and after inserting the fastening device, engaging the first end of the main body of the securing pin with the complementary receiving element, thereby coupling the second structural member to the first structural member.

4. The method of claim 2 further comprising: before inserting the fastening device in the void formed in the first structural member, inserting a spacer onto the shank of the fastening device.

5. The method of claim 2 further comprising: before inserting the fastening device in the void formed in the first structural member, inserting a spacer onto the void and inserting the shank of the fastening device through the spacer.

6. The method of claim 3 further comprising: before inserting the fastening device in the void formed in the first structural member, inserting a spacer onto the shank of the fastening device.

7. The method of claim 1 wherein the elongated aperture is elongated along a longitudinal axis of the main body.

8. The method of claim 3 wherein the fastening device is a screw, and the complementary receiving element is a nut.

9. A method comprising:
providing a first structural member of a modular furniture assembly, wherein a first void and a second void are formed in the first structural member;
providing a second structural member of the modular furniture assembly, wherein a split-ring washer is coupled to a third void formed in the second structural member;
providing a securing pin comprising a main body having a first end and a second end, the second end of the main body comprising a larger diameter than an interior diameter of the split-ring washer, and the first end of the main body comprising an elongated countersink portion and an elongated aperture, wherein the securing pin is inserted into a hole of the split-ring washer, and the second end is pushed into the split-ring washer such that an exterior diameter of the split-ring washer expands to engage further with sides of the third void; and
coupling the second structural member to the first structural member by: inserting the first end of the securing pin into the first void of the first structural member; and inserting a fastening device, comprising a shank, through the second void formed in the first structural member such that the shank passes through the elongated aperture of the main body of the securing pin.

10. The method of claim 9 wherein an axis of the first void is transverse to an axis of the second void of the first structural member.

11. The method of claim 9 wherein a complementary receiving element is coupled to the first structural member, and
after inserting the fastening device, engaging the first end of the main body of the securing pin with the complementary receiving element.

12. The method of claim 9 further comprising: before inserting the fastening device into the second void formed in the first structural member, inserting a spacer onto the shank of the fastening device.

13. The method of claim 11 further comprising: before inserting the fastening device into the second void formed in the first structural member, inserting a spacer onto the shank of the fastening device.

14. The method of claim 9 wherein the elongated aperture is elongated along a longitudinal axis of the main body of the securing pin.

15. The method of claim 11 wherein the fastening device is a screw, and the complementary receiving element is a nut.

16. A method comprising:
providing a first structural member of a modular furniture assembly, wherein a first void and a second void are formed in the first structural member;
providing a second structural member of the modular furniture assembly, wherein a split-ring washer is coupled to a third void formed in the second structural member;
providing a securing pin comprising a main body having a first end and a second end, the second end of the main body comprising a larger diameter than an interior diameter of the split-ring washer, and the first end of the main body comprising an elongated countersink portion and an elongated aperture, and the securing pin is inserted into a hole of the split-ring washer, and the second end is pushed into the split-ring washer such that an exterior diameter of the split-ring washer expands to engage further with sides of the third void; and
coupling the second structural member to the first structural member by: inserting the first end of the securing pin into the first void of the first structural member; and inserting a screw, comprising a threaded shank, through the second void formed in the first structural member and the threaded shank passes through the elongated aperture of the main body of the securing pin.

17. The method of claim 16 wherein a nut is coupled to the first structural member, and the method further comprises: after inserting the screw through the elongated aperture of the main body of the securing pin, screwing the screw to engage with the nut.

18. The method of claim 16 wherein a nut is coupled to the first structural member, and the method further comprises: inserting a spacer onto the threaded shank of the screw, wherein the spacer comprises a conical portion; and after inserting the screw with the spacer through second void, screwing the screw to engage with the nut, wherein a head of the screw presses the spacer and its conical portion against the elongated countersink portion of the securing pin.

19. The method of claim 16 wherein the elongated aperture is elongated along a longitudinal axis of the main body.

20. The method of claim 16 wherein the threaded shank is cylindrically shaped.

* * * * *